United States Patent
Lee et al.

(10) Patent No.: US 7,582,229 B2
(45) Date of Patent: Sep. 1, 2009

(54) PHOTOPOLYMERIZATION ELECTRODE PASTE COMPOSITION

(75) Inventors: Keun Soo Lee, Seoul (KR); Seok Hyun Jung, Chungcheongbuk-do (KR); Gyung Soo Kim, Chungcheongbuk-do (KR); Jong Hyung Choi, Chungcheongbuk-do (KR); Jeong Seob Shim, Daegu (KR)

(73) Assignee: LG Electronics Inc., Seoul (KR)

( * ) Notice: Subject to any disclaimer, the term of this patent is extended or adjusted under 35 U.S.C. 154(b) by 378 days.

(21) Appl. No.: 11/634,840

(22) Filed: Dec. 7, 2006

(65) Prior Publication Data

US 2008/0061693 A1     Mar. 13, 2008

(30) Foreign Application Priority Data

Sep. 7, 2006     (KR) ................... 10-2006-0086227

(51) Int. Cl.
    *H01B 1/22* (2006.01)
(52) U.S. Cl. ........................ 252/512; 252/514
(58) Field of Classification Search .......... 252/512–514
    See application file for complete search history.

(56) References Cited

U.S. PATENT DOCUMENTS 5,645,765 A * 7/1997 Asada et al. ............ 252/519.51
6,800,420 B2 * 10/2004 Song et al. .............. 430/281.1
7,105,256 B2 * 9/2006 Fukushima ................. 430/9
2006/0071202 A1 4/2006 Lee et al.

FOREIGN PATENT DOCUMENTS

| EP | 1 168 079 A1 | 1/2002 |
| JP | 2004-205532 A | 7/2004 |
| KR | 10-2006-0045846 A | 5/2006 |
| KR | 10-2007-0024084 A | 3/2007 |

* cited by examiner

*Primary Examiner*—Mark Kopec
(74) *Attorney, Agent, or Firm*—Birch, Stewart, Kolasch & Birch, LLP

(57) ABSTRACT

The present invention relates to an electrode paste composition, a front plate of plasma display panel, and a manufacturing method manufactured using the same. The front plate of plasma display panel comprises a front substrate, a bus electrode disposed on a predetermined position of the front substrate and a black matrix disposed in each discharge cell. The paste composition for a bus electrode comprises about 5 to 20 parts by weight of a binder, about 2 to 15 parts by weight of a photopolymerization monomer, about 1 to 8 parts by weight of a photopolymerization initiator, about 5 to 20 parts by weight of a solvent, about 1 to 10 parts by weight of a glass powder, about 50 to 80 parts by weight of a metal powder and about 0.1 to 5 parts by weight of a boron oxide ($B_2O_3$). In the paste composition and the front plate of the plasma display panel using the same according to the present invention, it can be formed a bus electrode on a substrate directly using a paste composition for electrode which is mixed a boron oxide in a silver.

3 Claims, 4 Drawing Sheets

PHOTOPOLYMERIZATION ELECTRODE PASTE COMPOSITION

CROSS-REFERENCE TO RELATED APPLICATIONS

This application claims priority from Korean Patent Application No. 10-2005-0086227 filed on Sep. 7, 2006, the content of which is incorporated herein by reference in its entirety.

BACKGROUND

1. Field

The present invention relates to an electrode paste composition, a front plate of plasma display panel, and a manufacturing method manufactured using the same. Particularly, the present invention relates to the front plate of plasma display panel capable of forming a bus electrode on a substrate directly, and manufacturing method thereof.

2. Background

Plasma display panel (PDP) is a flat panel display device that can display images or information by using a light-emitting phenomenon from plasma discharge. PDP is generally divided into DC-type and AC-type according to panel structure and driving method.

PDP generates plasma discharge in each cell separated by barrier ribs. Thus, PDP is a display device using the light emitting phenomenon of visible rays generated from the energy difference when ultraviolet rays generated by plasma discharge of a gas (such as He, Xe, etc.) provided in each cell returns to the ground state by exciting a phosphor in the cell.

PDP has several advantages such as simple structure, easy manufacturing due to simple structure, high brightness, high luminous efficacy, memory capacity effect, and a wide viewing angle over 160°. Also, PDP can be used for wide screens of 40 or more inches.

FIG. 1 is cross-sectional view illustrating the front plate of PDP in the art.

In FIG. 1, a front plate of PDP 100 is formed a transparent electrode 120, a bus electrode 140, a black matrix 130, a front dielectric layer 150 and a protection layer 160 on a substrate 110 in sequence.

The transparent electrode 120 is made of indium tin oxide (ITO) for transmitting light supplying from a discharging cell.

The bus electrode 140 is made of silver (Ag) having high conductivity.

The bus electrode 140 decreases driving voltage of the transparent electrode 120 of low conductivity because it is made of high conductivity material.

The black matrix 130 is formed between the transparent electrode 120 and the bus electrode 140, and prevents that the bus electrode 140 make fade in other area because it is made of low conductivity material. It will be described following. Also, the black matrix 130 is formed very thin thickness for applying an electric current between the transparent electrode 120 and the bus electrode 140. And, the black matrix 130 plays a role of increasing a contrast of PDP.

The black matrix 130a formed on both sides of the transparent electrode 120 plays a role of dividing between the discharging cells.

The front dielectric layer 150 and the protection layer 160 are laminated on the substrate 110 forming the transparent electrode 120, the bus electrode 140 and the black matrix 130.

The front dielectric layer is accumulated an electric charge generating at the time of plasma discharging.

The protection layer 160 protects damage of the front dielectric layer 150 by sputtering at the time of plasma discharging and increases discharging efficiency of second electrode.

However, as the size of PDP becomes bigger, the length of the transparent electrode 120 becomes longer. Accordingly, the resistance of the transparent electrode 120 becomes high, and due to the above characteristic of the ITO, the electric conductivity becomes low, which becomes a new problem.

To solve this problem, a method of further adding the bus electrode 140 to the transparent electrode 120 was used.

But, such method has a limit.

Thus, as a preferable method presented for solving the problem, the bus electrode 140 was formed directly on the substrate 110.

FIG. 2 is a cross-sectional view illustrating a fading area of the front plate of FIG. 1 when the bus electrode is formed directly on the substrate.

In FIG. 2, in case the bus electrode 140 is formed directly on the substrate 110, the fading area 142 is generated around the substrate 110 contacting with the bus electrode 140.

This fading area is made because a silver ion ($Ag^+$) reacts with a tin (Sn) on the surface of the substrate 110 when silver (Ag), main material of the bus electrode 140, contacts the substrate 110.

In short, in case the bus electrode 140 is formed directly on the substrate 110, there was a problem to cause fading on the substrate 110.

The above references are incorporated herein by reference where appropriate for teachings of additional or alternative details, features and/or technical background.

BRIEF DESCRIPTION OF THE DRAWINGS

Preferable embodiments will be described in detail with reference to the following drawings in which same reference numerals refer to same elements wherein.

DETAILED DESCRIPTION OF THE INVENTION

One object of the present invention is to provide a front plate of a plasma display panel (PDP) in which a bus electrode can be formed directly on a substrate by using a paste composition for bus electrode which boron oxide is added to silver, and a manufacturing method of the same.

Another object of the present invention is to provide an electrode paste composition, wherein a fading phenomenon is not generated on a substrate though a bus electrode is formed on the substrate directly, and a front plate of PDP manufactured by using the same, and a manufacturing method of the same.

Further another object of the present invention is to provide a front plate of PDP which can simplify the manufacturing process of the front plate, and decrease the manufacturing cost, and a manufacturing method of the same.

The present invention will be more clearly understood from the detailed description in conjunction with the following drawings.

Figure 1:
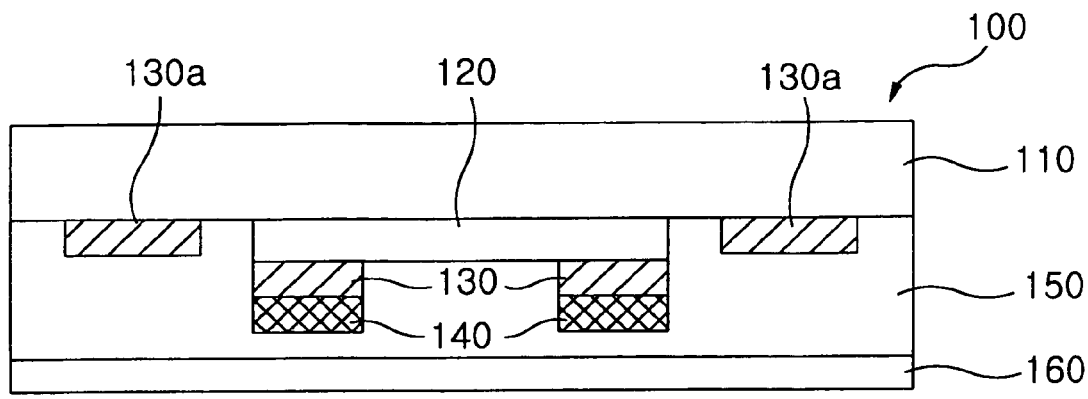
FIG. 1 is a cross-sectional view illustrating the front plate of PDP in the art.
Figure 2:
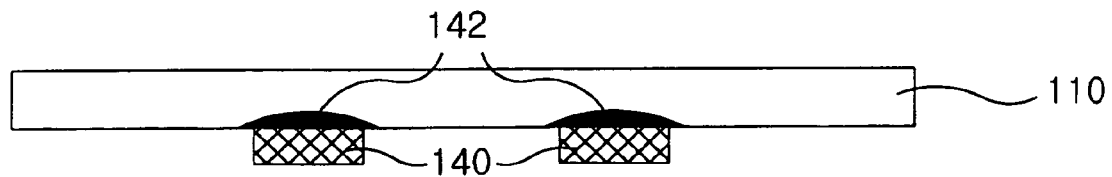
FIG. 2 is a cross-sectional view illustrating a fading area of the front plate of FIG. 1 when the bus electrode is formed on the substrate directly.
Figure 3:
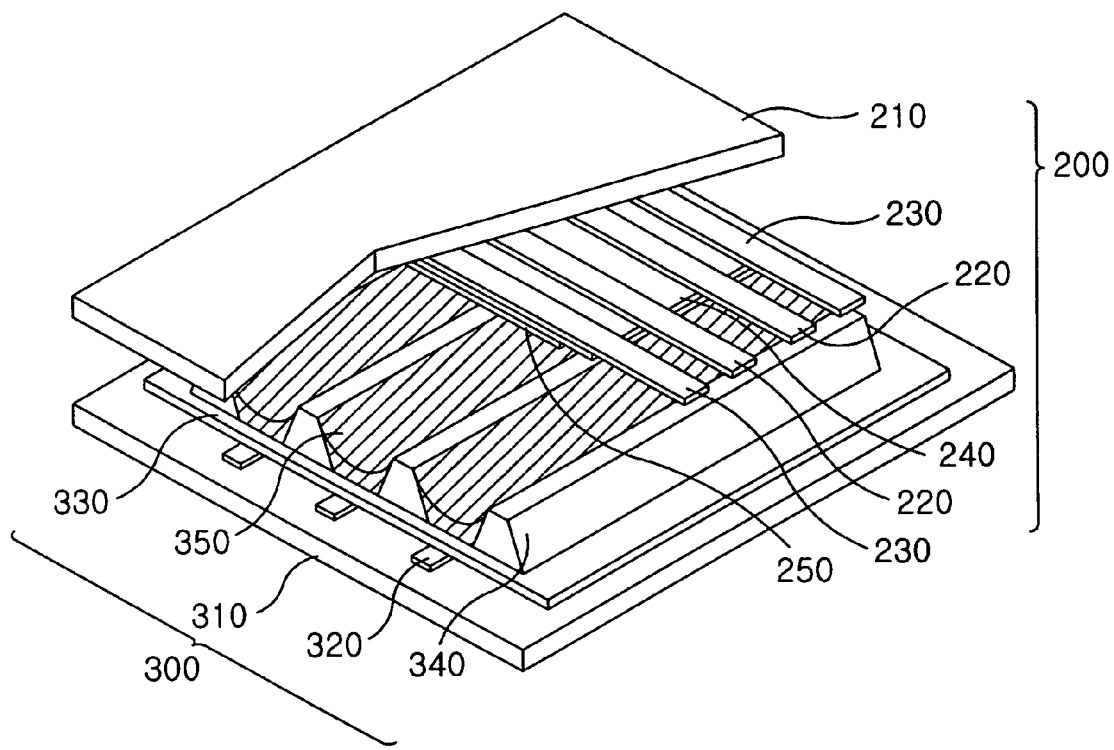
FIG. 3 is a perspective view illustrating the PDP according to one embodiment of the present invention.

FIG. 3 is a perspective view illustrating the PDP according to one embodiment of the present invention.

In FIG. 3, the structure of PDP is divided into a front plate 200 and a rear plate 300.

In the front plate 200, bus electrodes 220, black matrix 230, an front dielectric layer 240, and a protection layer 250 are formed on a lower side of a glass substrate 210 (hereinafter, referred to as "front substrate").

The bus electrodes 220 are formed on the front substrate 210 at regular intervals.

The bus electrodes 220 are made of a material that a boron oxide ($B_2O_3$) is added to metal powder, like silver (Ag) powder, having high conductivity. Boron oxide plays a role of preventing fading of the front substrate 210 by silver when the bus electrodes 220 are formed on the front substrate 210 directly.

The bus electrodes 220 are made of a paste composition. The paste composition comprises about 5 to 20 parts by weight of the binder, about 2 to 15 parts by weight of the photopolymerization monomer, about 1 to 8 parts by weight of the photopolymerization initiator, and about 5 to 20 parts by weight of the solvent, about 1 to 10 parts by weight of the glass powder, about 50 to 80 parts by weight of the metal powder and about 0.1 to 5 parts by weight of the boron oxide.

In the paste composition, the binder is at least one selected from a group of a methacrylic binder, an acrylic binder and a cellulose binder, and is not limited the group. Preferably, the binder is the acrylic binder.

And, the photopolymerization monomer is used for promoting photo-curing of the paste composition for electrodes and improving the developing property.

The examples of the photopolymerization monomer are 2-hydroxyethylacrylate, 2-hydroxypropylacrylate, diethyleneglycoldiacrylate, triethylenglycoldiacrylate, polyethylenglycoldiacrylate, polyurethanediacrylate, trimethylpropanetriacrylate, pentaerythritoltriacrylate, pentaerythritoltetraacrylate, triacrylate degenerated trimethylpropaneethyleneoxide, triacrylate degenerated trimethylpropanepropyleneoxide, dipentaerythritolpentaacrylate, dipentaerythritolhexaacrylate, and methacrylate corresponding to the above kinds of acrylate; and mono-, di-, tri-, or more polyester formed with polybasic acid, for example, phthalic acid, adipic acid, maleic acid, atconic acid, succinic acid, trimellitic acid, terephthalic acid, and hydroxyalkyl(metha) acrylate. Also, the above kinds of photopolymerization monomer may be used alone or in combination of two or more kinds. Especially, it is preferable for the photopolymerization monomer to be poly-functional monomer having two more acrylic groups or methacrylic groups in one molecule.

And, the photopolymerization initiator may be one or more selected from the group consisting of benzoinalkylester, for example, benzoin, benzoinmethylaester, benzoinethylester and benzoinisopropylester; acetophenone type, for example, acetophenone, 2.2-dimethoxy-2-phenylacetophenone, 2.2-diethoxy-2-phenylacetophenone, 1.1-dichloroacetophenone; aminoacetophenone type, for example, 2-methyl-1-[4-(methyltio)phenyl]-2-morpolypropane-1-on, 2-benzyl-2-dimethylamino-1-[4-morpolyphenyl]-butane-1-on; anthraquinone type, for example, 2-methylanthraquinone, 2-ethylanthraquinone, 2-t-butylanthraquinone, 1-chloranthraquinone; tioxanthone type, for example, 2.4-dimethyltioxanthone, 2.4-diethyltioxanthone, 2-chlortioxanthone, 2.4-disopropyltioxanthone; ketal type, for example, acetophenonedimethylketal, benxyldimethylketal; benzophenon; phosphineoxide type, for example, (2.6-dimethoxybenzoyl)-2.4.4-pentylphosphineoxide, bis(2.4.6-trimethylbezoyl)-phenylphosphineoxide, 2.4.6-trimethylbenzoyldiphenylphosphineoxide, ethyl-2.4.6-trimethylbenzoyldiphenylphosphinate; and peroxide.

Also, the glass powder may be mixed in a range that they do not damage properties of the paste composition.

In case the glass powder is added to the paste composition, a film formed after exposure and developing can be easily sintered under 600° C. or less. It is preferable to use the glass powder comprising at least one selected from the group consisting of a lead oxide, a bismuth oxide, a lithium oxide, or a zinc oxide, as a main component.

Also, the metal powder is at least one selected from a group of silver (Ag) powder, copper (Cu) powder and aluminum (Al) powder, and is not limited the group. Preferably, the metal powder is silver powder.

Also, the solvent can be mixed as a diluent in the manufacturing process of the paste composition for viscosity control, film manufacture by drying, and contact exposure.

The solvent may be one or more selected from the group consisting of ketone, for example, methylethylketone, cyclohexanone; aromatic Hydrocarbons, for example, toluene, xylene, tetramethylbenzene; glycolether, for example, cellosolve, methylcellosolve, carbitol, methylcarbitol, butylcarbitol, propyleneglycolmonomethylester, dipropyleneglycolmonomethylester, dipropyleneglycolmonoethylester, trietyhtlenglycolmonoethylester; acetic ester, for example, ethyl acetate, butyl acetate, cellosolveacetate, butylcellosolveacetate, carbitolacetate, butylcarbitolacetate, propylenglycolmonomethylesteracetate; alcohol, for example, ethanol, propanol, ethylene glycol, propylene glycol, aliphatic hydrocarbon, for example, octane, decane; and petroleum solvent, for example, petroleum ether, naphtha, naphtha with hydrogen, solvent naphtha.

The black matrix 230 is disposed between the bus electrodes 220 to divide between adjacent discharge cells. Also, the black matrix 230 enhances the contrast of PDP by absorbing outside light and inside transmitted light between adjacent discharge cells.

The front dielectric layer 240 directly contacts with the bus electrodes 220 made of metallic material, and may be made of PbO-based glass or non-Pb-based glass in order to avoid chemical reactions with the bus electrodes 220. This front dielectric layer 240 restricts discharge current to maintain glow discharge, and the electric charges generated at the time of plasma discharge are laminated.

The protection layer 250 prevents damage of the front dielectric layer 240 by sputtering at the time of plasma discharge, and increases the discharge efficiency of the secondary electrons as well. The protection layer 250 is made up of magnesium oxide (MgO).

In the rear plate 300 of PDP, address electrodes 320, a rear dielectric layer 330, barrier ribs 340, and a phosphor layer 350 are disposed on the upper surface of a glass substrate 310 (hereinafter, referred to as "rear substrate").

The address electrodes 320 are positioned at the middle of each discharge cell. The address electrodes 320 may have a line width of about 70 to 80 μm.

The rear dielectric layer 330 is disposed on the entire surface of the rear substrate 310 and the address electrodes 320, and protects the address electrodes 320. The rear dielectric layer may be made of PbO-based glass in order to avoid chemical reactions with the address electrodes 320 made of silver.

The barrier ribs 340 are positioned on top of the rear dielectric layer 330, spaced by a predetermined distance from the address electrodes 320, and formed longer in the perpendicular direction.

The barrier ribs 340 are needed to maintain the discharge distance, and prevent electrical and optical interference between adjacent discharge cells.

The phosphor layer 350 is formed over both sides of the barrier ribs 340 and the upper surface of the rear dielectric layer 330.

The phosphor layer 350 is excited by the ultraviolet rays generated at the time of plasma discharge, and generates a red (R), green (G) or blue (B) visible ray.

Hereinafter, the light emitting mechanism of PDP will be described in detail.

In FIG. 3, when a predetermined voltage (within a voltage margin) is applied to the bus electrode 220 and the address electrode 320, plasma is formed between the bus electrode 220 and the address electrode 320. A certain amount of free electrons exist in gas, and the free electrons receive a force (F=q·E) when an electrical field is applied to the gas.

If the electrons to which the force is exerted obtain an energy (the first ionization energy) enough to remove electrons in the outermost orbit, they ionize the gas, and thus generated ions and electrons are moved to both electrodes by the electromagnetic force. Particularly, secondary electrons are generated when the ions collide with the protection layer 250, and these secondary electrons help generation of plasma.

Thus, a high voltage is required to begin an initial discharge, but once a discharge is begun, a lower voltage is required, as the electron density is increased.

The gas provided in the cells of PDP is generally an inert gas, such as Ne, Xe, He, etc. Particularly, a red, green or blue visible ray is generated when an ultraviolet ray with a wavelength of between about 147 nm and 173 nm is applied to the phosphor layer 350.

The visible ray emitted at this time is determined according to the kind of phosphor layer 350, and thus each discharge cell becomes a pixel representing each red, green, or blue color.

The color of each discharge cell is controlled by combination of RGB in each discharge cell. In case of this exemplary PDP, the color is controlled by controlling the time that plasma is generated.

Thus generated visible ray is emitted to the outside of the cell through the front substrate 210.

Hereinafter, the manufacture process of the front plate 200 of PDP will be described.

FIGS. 4A-4F are cross-sectional views illustrating the steps of forming the front plate of PDP of FIG. 3.

Figure 4A:
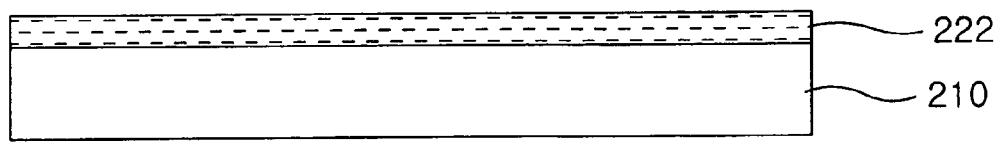
FIGS. 4A-4F are cross-sectional views illustrating the steps of forming the front plate of PDP of FIG. 3.

As shown in FIG. 4A, a paste composition 222 is applied onto the front substrate 210. The paste composition 222 is made of mixing the boron oxide ($B_2O_3$) in the silver powder (Ag).

Figure 4B:
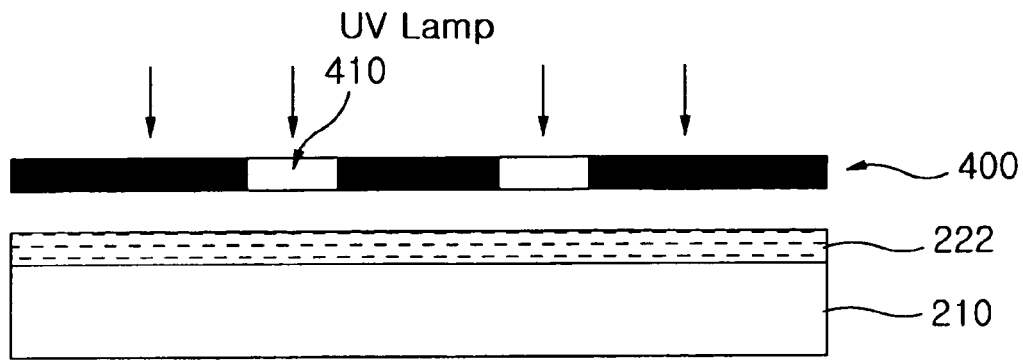

Next, a first mask 400 having a certain opening 410 is disposed on the front substrate 210 onto which the paste composition 222 is applied. The opening 410 of the first mask 400 is formed at a corresponding position to a position at which the bus electrode 220 will be formed, as shown in FIG. 4B.

Then, the exposure may be performed on top of the first mask 400 for a certain period of time.

In case of exposing, the light exposing equipment is used to perform exposure. Exposure is generally carried out with the masked exposure method using a photo mask, as in ordinary photolithography. The mask used may be of a negative type or a positive type.

Direct pattern formation by means of a red or blue visible laser beam or Ar ion laser beam may be performed instead of using a photo mask.

Exposure devices such as stepper exposer or proximity exposer may be used. For light exposure of a large area, a paste or an electrode material may be applied over a glass or other substrate, followed by performing exposure while conveying the substrate to allow a large area to be exposed by means of a light exposer with a small light source.

The active light sources that can be used effectively include visible light, near ultraviolet light, ultraviolet light, electron beam, X-ray, and laser beam. Of these, ultraviolet light is preferred, and such sources as low-pressure mercury lamp, high-pressure mercury lamp, extra-high pressure mercury lamp, halogen lamp, and germicidal lamp can be used. Of these, the extra-high pressure mercury lamp is preferred.

Hereinafter, it will be describing in case of exposure using UV lamp. The exposure process of the present embodiment can be performed by the above exposure methods, and also it is not limited using the UV lamp.

In case of irradiating the UV lamp in the exposure process, the paste composition 222 is cured in response to the UV lamp. At this time, only a certain part of the paste composition 222 is cured by the first mask 400 disposed on the paste composition 222. That is, the paste composition 222 disposed under the opening 410 is cured by exposing the paste composition 222 to the UV lamp, and the paste composition 222 disposed under a part in which the opening 410 is not formed is cured because the UV lamp cannot pass through.

Subsequently, after removing the first mask 400, the front substrate 210 is developed by developer.

Figure 4C:
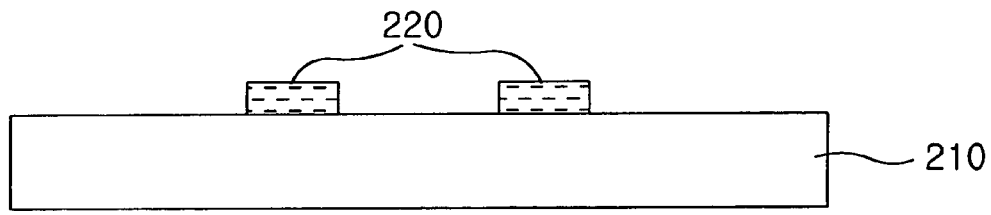

As a result, as shown in FIG. 4C, the other part of the paste composition 222 is removed, except the cured part in response to the UV lamp. Then, a sintering process is performed to complete formation of the bus electrode 220.

Figure 4D:
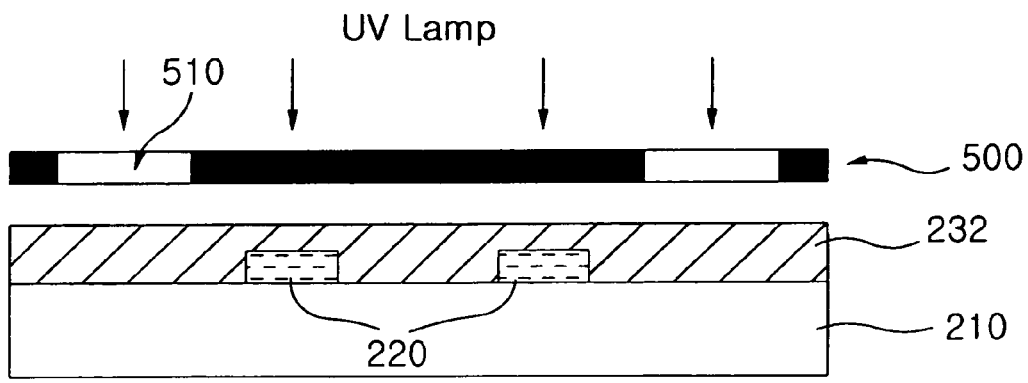
Figure 4E:
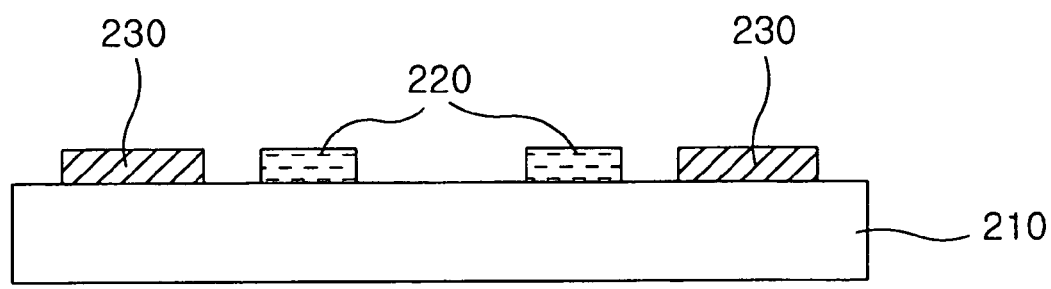

Next, a black matrix material 232 is applied on the front substrate 210 formed the bus electrode 220 as shown in FIG. 4D. A second mask 500 having a certain opening 510 is disposed on the front substrate 210 onto which the black matrix material 232 is applied.

In the second mask 500, the opening 510 is formed at a position corresponding to a position at which the black matrix 230 are formed, as shown in FIG. 4D.

Then, the exposure may be performed on top of the second mask 500, to be exposed to the UV lamp.

In this case of exposing the black matrix material 232 to the UV lamp, the black matrix material 232 are cured in response to the UV lamp. At this time, only a part of the black matrix material 232 is cured by the second mask 500 on the black matrix material 232. That is, the black matrix material 232 disposed under the opening 510 are cured by exposing the black matrix material 232 to the UV lamp, and the black matrix material 232 disposed under a part in which the opening 510 is not formed are not cured because the UV lamp cannot pass through.

And, a developing process is performed after removing the second mask 500. The other part of the black matrix material 232 is removed, except the cured part in response to the UV lamp. Then, a sintering process is performed to complete formation of the black matrixes 230.

Figure 4F:
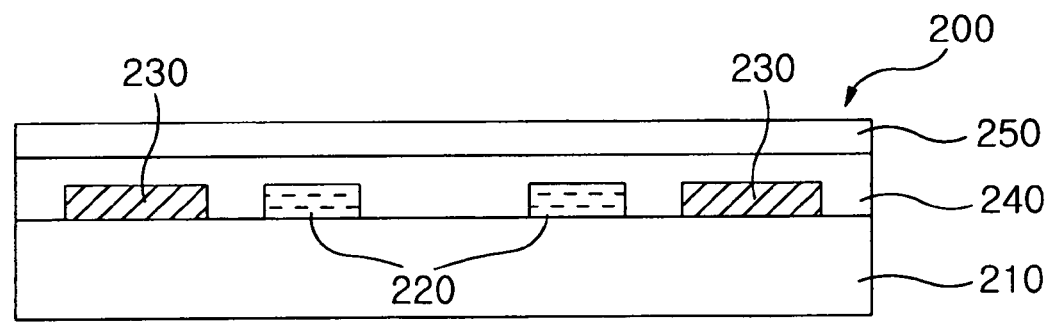

Next, a dielectric material is applied onto the front substrate 210 on which the bus electrode 220, the black matrix 230 are formed, to form the front dielectric layer 240, as shown in FIG. 4F.

Then, MgO is applied onto the front dielectric layer 240 to form the protection layer 250.

In short, the bus electrode 220 can be made of the paste composition 222 in which boron oxide is added to silver, and so can be directly formed on the front substrate 210. Thus, the present invention has such effects that the process of forming a transparent electrode through ITO patterning process can be omitted, and the manufacturing cost can be reduced since ITO having high manufacturing cost need not be used.

Hereinafter, the trial test results to PDP on which the bus electrode 220 are directly formed on the front substrate 210 according to the above embodiment will be described.

In reference to Table 1, the components of a paste composition for each bus electrode, and the trial test results thereto are as follows.

TABLE 1

| | Transparent electrode is present or not | $B_2O_3$ (%) | Yellow Index |
|---|---|---|---|
| Comparative example 1 | X | 0 | 19 |
| Comparative example 2 | O | 0 | 13 |
| Example 1 | X | 0.2 | 16 |
| Example 2 | X | 0.4 | 11 |
| Example 3 | X | 0.6 | 11 |
| Example 4 | X | 0.8 | 11 |
| Example 5 | X | 1.0 | 14 |

In Table 1, the paste composition of Comparative Examples 1 and 2 comprises about 10 parts by weight of acrylic binder, 8 parts by weight of photopolymerization monomer, 2 parts by weight of photopolymerization initiator, 10 parts by weight of solvent, 3 parts by weight of glass powder, and 67 parts by weight of silver powder.

N-butylcarbitol was used as solvent.

Comparative Example 1 tested the fade level after drying/sintering by directly printing the paste composition on a soda-lime glass substrate.

Comparative Example 2 tested the fade level after drying/sintering by printing the paste composition on a soda-lime glass substrate on which a transparent electrode is formed.

The paste compositions of Examples 1 to 5 used a paste composition that $B_2O_3$ was added to the first paste composition of the same composition as the paste composition of Comparative Examples 1 and 2. Also, the other components except $B_2O_3$ had same kinds and contents as those of the first paste composition.

In Example 1, 0.2% of $B_2O_3$ was added to the first paste composition. In Example 2, 0.4% of $B_2O_3$ was added to the first paste composition. In Example 3, 0.6% of $B_2O_3$ was added to the first paste composition. In Example 4, 0.8% of $B_2O_3$ was added to the first paste composition. And, in Example 5, 1.0% of $B_2O_3$ was added to the first paste composition.

Examples 1 to 5 tested the fade level after drying/sintering by directly printing the above paste compositions on a soda-lime glass substrate.

The fade levels of Comparative Examples and Examples were tested by measuring Yellow Index. As the Yellow Index is lower, it is determined that the fading is less.

According to the test results, the Yellow Index of Comparative Example 1 was highest, 19, wherein the bus electrode is formed on the substrate directly by using the paste composition not having $B_2O_3$. Also, the Yellow Index of Comparative Example 2 is 13, wherein the bus electrode is formed on the transparent electrode by using the paste composition not having $B_2O_3$, which confirms that the fade level is less than that of Comparative Example 1.

That is, in case of forming the bus electrode by using the paste composition in the art, the fading is less only when the bus electrode is formed after forming the transparent electrode.

However, the Yellow Index of Examples 2 to 4 is 11, wherein the bus electrode is formed on the substrate directly by using the paste composition having $B_2O_3$, which confirms that the fading level is less than that of Comparative Example 2. The Yellow Index of Examples 1 and 5 is higher than that of Comparative Example 2, and lower than that of Comparative Example 1. The fading level can be controlled by the added amount of $B_2O_3$.

In short, it was confirmed that the bus electrode formed on the substrate directly by using the paste composition having $B_2O_3$ according to the present invention shows similar or more improved properties.

From the preferred embodiments of the present invention, it should be noted that modifications and variations can be made by a person skilled in the art in light of the above teachings. Therefore, it should be understood that changes may be made for a particular embodiment of the present invention within the scope and spirit of the present invention outlined by the appended claims.

An embodiment may be achieved in whole or in part by the paste composition for the bus electrode comprising about 5 to 20 parts by weight of a binder, about 2 to 15 parts by weight of a photopolymerization monomer, about 1 to 8 parts by weight of a photopolymerization initiator, about 5 to 20 parts by weight of a solvent, about 1 to 10 parts by weight of a glass powder, about 50 to 80 parts by weight of a metal powder, and about 0.1 to 5 parts by weight of a boron oxide ($B_2O_3$).

Any reference in the present specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to same embodiment. Further, when a particular feature, structure, or characteristic is described in connection with any embodiment, it is submitted that it is within the purview of one skilled in the art to affect such feature, structure, or characteristic in connection with other ones of the embodiment.

Although the embodiments have been described with reference to a number of illustrative embodiments, it should be understood that other numerous modifications and embodiments can be devised by those skilled in the art that will fall within the spirit and scope of the principles of this disclosure. Particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A paste composition for an electrode, comprising:
   about 5 to 20 parts by weight of a binder;
   about 2 to 15 parts by weight of a photopolymerization monomer;
   about 1 to 8 parts by weight of a photopolymerization initiator;
   about 5 to 20 parts by weight of a solvent;
   about 1 to 10 parts by weight of a glass powder;
   about 50 to 80 parts by weight of a metal powder; and
   about 0.2 to 1.0 parts by weight of a boron oxide ($B_2O_3$).

2. The paste composition of claim 1, wherein the binder is at least one selected from a group of a methacrylic binder, an acrylic binder and a cellulose binder.

3. The paste composition of claim 1, wherein the metal powder is at least one selected from a group of silver (Ag) powder, copper (Cu) powder and aluminum (Al) power.

* * * * *